(12) United States Patent
Covington et al.

(10) Patent No.: US 6,785,092 B2
(45) Date of Patent: Aug. 31, 2004

(54) WHITE HEAD FOR HIGH ANISOTROPY MEDIA

(75) Inventors: Mark William Covington, Pittsburgh, PA (US); Thomas McLendon Crawford, Pittsburgh, PA (US); Gregory John Parker, Warrendale, PA (US); Petrus Antonius Van der Heijden, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 296 days.

(21) Appl. No.: 10/153,129

(22) Filed: May 21, 2002

(65) Prior Publication Data

US 2003/0026040 A1 Feb. 6, 2003

Related U.S. Application Data

(60) Provisional application No. 60/307,774, filed on Jul. 24, 2001.

(51) Int. Cl.[7] ............................................. G11B 5/127
(52) U.S. Cl. ..................................... 360/126; 360/119
(58) Field of Search ................................ 360/119, 125, 360/126, 317, 318, 318.1, 321, 324, 324.1, 324.12, 121, 128

(56) References Cited

U.S. PATENT DOCUMENTS

| | | |
|---|---|---|
| 3,629,520 A | 12/1971 | Schwee |
| 5,576,914 A | 11/1996 | Rottmayer et al. |
| 5,636,093 A | 6/1997 | Gijs et al. |
| 5,668,688 A | 9/1997 | Dykes et al. |
| 5,695,864 A | 12/1997 | Slonczewski |
| 5,891,586 A | 4/1999 | Hasegawa et al. |
| 5,933,299 A | 8/1999 | Tanaka et al. |
| 5,949,600 A | 9/1999 | Akiyama et al. |
| 6,105,237 A | 8/2000 | Gill |
| 6,130,814 A | 10/2000 | Sun |
| 6,219,212 B1 | 4/2001 | Gill et al. |
| 6,603,677 B2 * | 8/2003 | Redon et al. ............... 365/158 |
| 6,621,664 B1 * | 9/2003 | Trindade et al. ............ 360/318 |
| 2002/0089795 A1 * | 7/2002 | Seigler et al. .............. 360/322 |
| 2002/0135935 A1 * | 9/2002 | Covington .................. 360/126 |

FOREIGN PATENT DOCUMENTS

| | | | | |
|---|---|---|---|---|
| EP | 918319 A1 * | 5/1999 | ............ | G11B/5/39 |
| JP | 10302203 A * | 11/1998 | ............ | G11B/5/02 |
| WO | WO 95/22820 | 8/1995 | | |

(List continued on next page.)

OTHER PUBLICATIONS

W. Cain et al., "Challenges in the Practical Implementation of Perpendicular Magnetic Recording," *IEEE Transactions on Magnetics*, vol. 32, No. 1, Jan. 1996, pp. 97–102.

(List continued on next page.)

*Primary Examiner*—William Klimowicz
(74) *Attorney, Agent, or Firm*—Robert P. Lenart, Esq.; Pietragallo, Bosick & Gordon (57) ABSTRACT

A write head for writing information bits to magnetic storage media includes a first write pole for producing a first magnetic field in a first direction and a second write pole for producing a second magnetic field such that the combined field from the two poles lies either substantially along the first direction or in a second direction that is substantially orthogonal to the first direction. The second write pole includes a free layer having magnetization controlled by spin transfer torque, and a first spacer positioned between the free layer and the first write pole. The write head can further include a pinned layer and a second spacer positioned between the pinned layer and the free layer. A disc drive that includes the write head and a method of writing to magnetic storage media that utilizes the write head are also included.

20 Claims, 6 Drawing Sheets

FOREIGN PATENT DOCUMENTS

| WO | WO 98/25263 | | 6/1998 | |
| --- | --- | --- | --- | --- |
| WO | WO 9901778 A1 | * | 1/1999 | ........... G01R/33/02 |
| WO | WO 00/77776 A1 | | 12/2000 | |
| WO | WO 2003010758 A1 | * | 2/2003 | ........... G11B/5/012 |
| WO | WO 2003019536 A2 | * | 3/2003 | ............ G11B/5/02 |

OTHER PUBLICATIONS

L. He et al., "A Theoretical Description of Magnetic Switching Experiments in Picosecond Field Pulses," *J. Appl. Phys.*, vol. 79, No. 8, Apr. 15, 1996, pp. 6489–6491.

I. Klik et al., "Relaxation Effects in Magnetic Recording," *IEEE Transactions on Magnetics*, vol. 32, No. 5, Sep. 1996, pp. 3860–3862.

J. C. Slonczewski, "Current–Driven Excitation of Magnetic Multilayers," *Journal of Magnetism and Magnetic Materials*, vol. 159, 1996, pp. L1–L7.

M. Tsoi et al., "Excitation of a Magnetic Multilayer by an Electric Current," *Physical Review Letters*, vol. 80, No. 19, May 11, 1998, pp. 4281–4284.

C.H. Back et al., "Magnetization Reversal in Ultrashort Magnetic Field Pulses," *Physical Review Letters*, vol. 81, No. 15, Oct. 12, 1998, pp. 3251–3254.

C.H. Back et al., "Minimum Field Strength in Precessional Magnetization Reversal," *Science*, vol. 285, Aug. 6, 1999, pp. 864–867.

E. B. Myers et al., "Current–Induced Switching of Domains in Magnetic Multilayer Devices," *Science*, vol. 285, Aug. 6, 1999, pp. 867–870.

H. Katayama et al., "New Developments in Laser–Assisted Magnetic Recording," *IEEE Transactions on Magnetics*, vol. 36, No. 1, Jan. 2000, pp. 195–199.

R. Wood, "The Feasibility of Magnetic Recording at 1 Terabit Per Square Inch," *IEEE Transactions on Magnetics*, vol. 36, No. 1, Jan. 2000, pp. 36–42.

J. A. Katine et al., "Current–Induced Realignment of Magnetic Domains in Nanostructured Cu/Co Multilayer Pillars," *Applied Physics Letters*, vol. 76, No. 3, Jan. 17, 2000, pp. 354–356.

J. A. Katine et al., "Current–Driven Magnetization Reversal and Spin–Wave Excitations in Co/Cu/Co Pillars," *Physical Review Letters*, vol. 84, No. 14, Apr. 3, 2000, pp. 3149–3152.

T. M. Crawford et al., "Coherent Control of Precessional Dynamics in Thin Film Permalloy," *Applied Physics Letters*, vol. 76, No. 15, Apr. 10, 2000, pp. 2113–2115.

M. Bauer et al., "Suppression of Magnetic–Field Pulse–Induced Magnetization Precession by Pulse Tailoring," *Applied Physics Letters*, vol. 76, No. 19, May 8, 2000, pp. 2758–2760.

F. J. Albert et al., "Spin–Polarized Current Switching of a Co Thin Film Nanomagnet," *Applied Physics Letters*, vol. 77, No. 23, Dec. 4, 2000, pp. 3809–3811.

W. E. Proebster, "Magnetic Transducer," *IBM Technical Disclosure Bulletin*, vol. 5, No. 5, Oct. 1962, p. 45, XP–002221761, Armonk, N.Y., ISSN: 0018–8689.

* cited by examiner

WRITE HEAD FOR HIGH ANISOTROPY MEDIA

CROSS REFERENCE TO RELATED APPLICATION

This application claims the benefit of U.S. Provisional Patent Application No. 60/307,774, filed Jul. 24, 2001.

BACKGROUND OF THE INVENTION

This invention relates to magnetic devices, and more particularly, to write heads for use in disc drives.

Recording heads for use with magnetic storage media typically include a writer and a reader that respectively record and detect magnetic domains in a disc that spins below the head. The writer in a conventional recording head can include a coil of one or more turns wrapped around a soft ferromagnetic yoke. Writers operate by passing an electric current through the coil, which produces a magnetic field that aligns the yoke magnetization along the field direction. For a longitudinal writer, a magnetic field extends mainly between the pole tips but also partly into the media. For a perpendicular writer, a soft underlayer is typically employed in the storage media such that the write field extends between the pole tip and soft underlayer. When the write field exceeds the coercivity and demagnetization field of the media, a domain forms with its magnetization aligned along the write field direction. These domains form the bits of digital data that are detected with the read head.

There are significant physical challenges in trying to achieve an areal density of 1 Tbit/in$^2$ with magnetic recording. Foremost among these will be the write process, in which magnetic domains, or bits, are created in the media. At these densities, the two primary obstacles facing the write process are the use of materials with large magnetic anisotropy in the media and the lack of soft ferromagnetic materials having $B_s$>2.4 T. The first obstacle is necessary to ensure thermal stability of the media. The average volume of the grains will have to decrease in order to maintain the same media signal-to-noise ratio, which is roughly set by the number of grains in a bit cell. However, in order to avoid superparamagnetism, the magnetic anisotropy has to commensurately increase so that the grains are ferromagnetic and stable over a time scale of years. The net result is that very large magnetic fields will be needed in order to orient the grains and record bits in the media. Since the write field is intimately related to the saturation moment of the pole tip material in the recording head, very high moment materials will be needed to switch the orientation of the media magnetization. Researchers are already using materials with $B_s$~2–2.4 T for 100 Gbit/in$^2$ recording, and the saturation moment requirement for conventional recording at 1 Tbit/in$^2$ is likely to be beyond any known material.

These challenges are well known in the data storage industry and alternatives to conventional magnetic recording, such as thermally assisted writing, have already been proposed. However, the best writer technology for 1 Tbit/in$^2$ is still undetermined. For instance, researchers are also investigating ways to switch the magnetization of thin film media that do not rely on thermally assisted processes. These approaches differ from conventional recording in that the alignment of the magnetic field with respect to the media magnetization is significantly different than 0° or 180°. The ultimate goal is to switch the media magnetization using fields that are less than the anisotropy field, $H_k$.

There is a need for a magnetic write head that can overcome the limitations of existing write heads to achieve increased areal data densities in magnetic recording media.

SUMMARY OF THE INVENTION

This invention provides a write head for writing information bits to magnetic storage media. The write head comprises a first write pole for producing a first magnetic field in a first direction and a second write pole for producing a second magnetic field such that a combined field from the first and second write poles lies either substantially along the first direction or in a second direction that is substantially orthogonal to the first direction. The second write pole includes a free layer having magnetization controlled by spin transfer torque, and a first spacer positioned between the free layer and the first write pole. The write head can further include a pinned layer and a second spacer positioned between the pinned layer and the free layer.

The invention also provides a disc drive comprising, means for rotating a magnetic storage medium, and means for positioning a write head adjacent to a surface of the magnetic storage medium, wherein the write head includes a first write pole for producing a first magnetic field in a first direction and a second write pole for producing a second magnetic field such that a combined field from the first and second write poles lies either substantially along the first direction or in a second direction that is substantially orthogonal to the first direction. The second write pole includes a free layer having magnetization controlled by spin transfer torque, and a first spacer positioned between the free layer and the first write pole. The write head can further include a pinned layer and a second spacer positioned between the pinned layer and the free layer.

The invention further provides a method of writing to magnetic storage media, the method comprising using a first write pole and a second write pole to produce a first magnetic field in a first direction to create a first change in the direction of magnetization of magnetic domains in the magnetic storage media, removing the first magnetic field, and using the first write pole and a second write pole to produce a second magnetic field lying in a second direction substantially orthogonal to the first direction to switch the direction of magnetization of the magnetic domains in the magnetic storage media, wherein one of the first and second write poles includes a free layer having a magnetization controlled by spin transfer.

The first magnetic field can be oriented in a down track direction or a cross track direction. While each of the first and second magnetic fields cannot be arbitrarily small, they can have a magnitude less than the magnetic anisotropy of the magnetic storage media.

The magnetic fields can be produced by applying current pulses to the first and second write poles to produce first and second magnetic field pulses. The first and second field pulses can be separated in time by a period less than the relaxation time of the magnetic storage media. Alternatively, a sequence of current pulses can be applied to either the first or second write poles, wherein the current pulses are timed to suppress spin precession in the corresponding write pole.

DETAILED DESCRIPTION OF THE INVENTION

Figure 1:
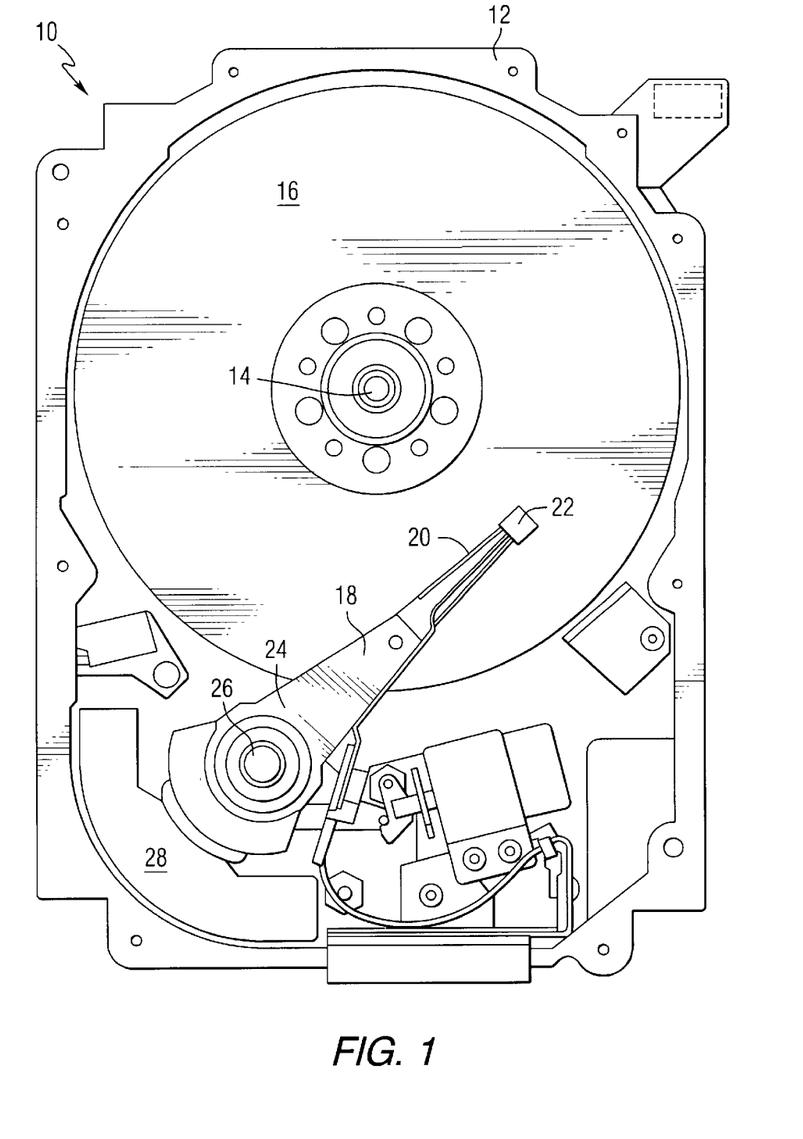
FIG. 1 is a pictorial representation of a disc drive that can use magnetic write heads constructed in accordance with this invention.

This invention encompasses magnetic write heads for use with magnetic recording media, disc drives that include the write heads, and methods for using the write heads to record data bits in magnetic storage media. FIG. 1 is a pictorial representation of a disc drive 10 that can utilize magnetic write heads constructed in accordance with this invention. The disc drive includes a housing 12 (with the upper portion removed and the lower portion visible in this view) sized and configured to contain the various components of the disc drive. The disc drive includes a spindle motor 14 for rotating at least one magnetic storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

Figure 2:
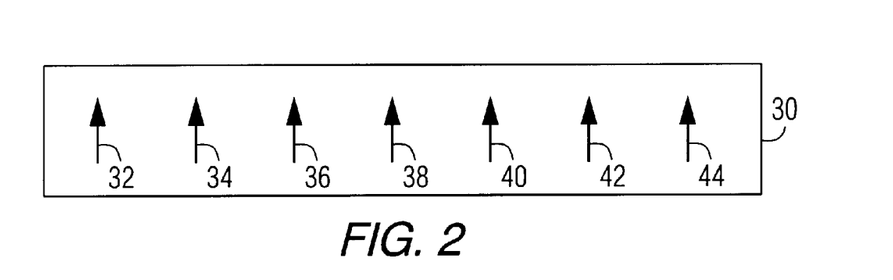
FIGS. 2, 3, 4 and 5 are schematic representations of a portion of a magnetic storage medium.
Figure 3:
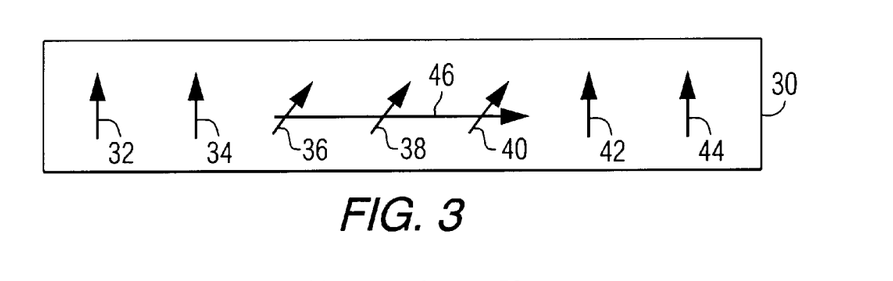
Figure 4:
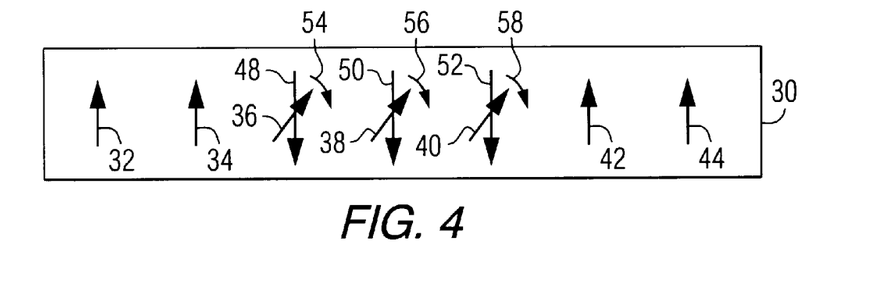
Figure 5:
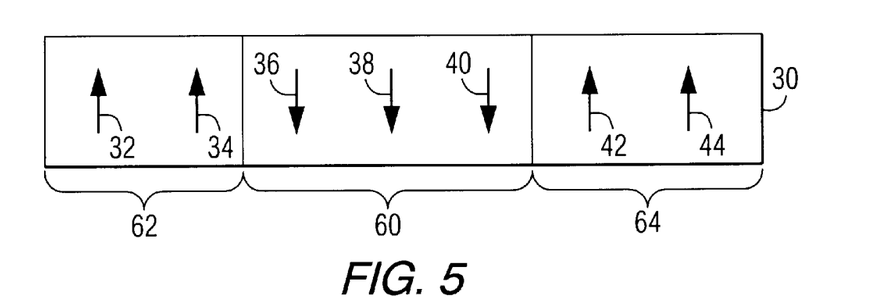

The write heads of this invention use two magnetic field pulses to switch the direction of magnetization of magnetic domains in the storage medium. This process is shown conceptually in FIGS. 2–5. FIGS. 2–5 are schematic representations of a section 30 of a magnetic storage media hard layer. FIG. 2 shows an initial state of the media with the magnetization pointing upward as shown by arrows 32–44. FIG. 3 shows the magnetization when a localized magnetic field 46 is applied in the plane of the media, orthogonal to the magnetization. The amplitude of the field 46 is less than the anisotropy field $H_k$, and the spins rotate to some intermediate angle between the perpendicular and in-plane directions. FIG. 4 shows the magnetization when the in-plane field is quickly removed such that the spins cannot relax back to their initial state before the application of a second localized field that is aligned anti-parallel to the initial spin direction. The second field is directed perpendicular to the plane of the media and is illustrated by arrows 48, 50 and 52. This causes the magnetization represented by arrows 36, 38 and 40 to rotate in the direction indicated by arrows 54, 56 and 58. FIG. 5 shows the spin configuration after removal of the perpendicular field. The direction of magnetization has been reversed in one portion 60 of the storage medium forming a data bit. In this example, the direction of magnetization of domains in adjacent portions 62 and 64 remain unchanged. The perpendicular field shown in FIG. 4 is able to finish driving the magnetization over the energy barrier and complete the switching of the magnetization by 180° with respect to the initial state.

Figure 6:
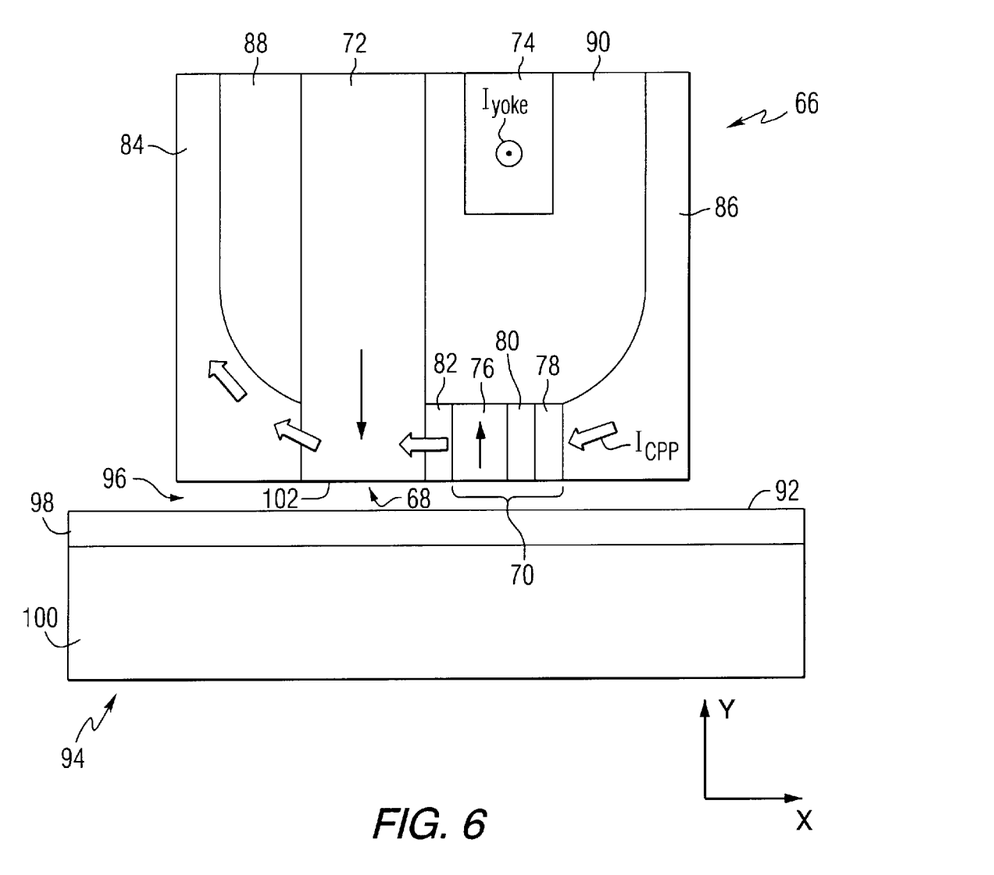
FIG. 6 is a side elevation view of a magnetic write head constructed in accordance with the invention.

FIG. 6 is a schematic representation of a cross-section of a write head 66 including two magnetic writers 68 and 70.

The writer 68 includes a first pole 72, also referred to as a write pole (WP), and a wire 74, or coil, for carrying a current $I_{yoke}$ to drive the write pole. The second writer 70 comprises a freely rotatable layer, also called the free layer, 76 driven by the torque from spin-polarized electron current ($I_{CPP}$) flowing between the free layer 76 and a magnetic layer 78 with fixed magnetization, also called the pinned layer 78. A non-magnetic spacer 80 preserves the spin polarization of conduction electrons diffusing between the freely rotatable layer and the pinned layer. Another non-magnetic spacer 82 serves as an electron spin depolarizer so that there is no spin transfer torque between the pole 72 and the freely rotatable layer 76. Conductors 84 and 86 serve as means for conducting current from an external current source, such as a disc drive preamp, to the writer 70 formed by the freely rotatable layer 76, the pinned layer 78, and the spacer 80. The current flows in a direction that is perpendicular to the planes of these components. The current also flows through a portion of the write pole 72. Insulation 88 and 90 is positioned between the various components of the write head as illustrated. Insulation 88 is optional since the write pole 72 and conductor 84 are electrically connected.

In operation, the write head will fly above the surface 92 of the magnetic storage media 94, separated by an air bearing 96. The magnetic storage media includes a magnetically hard layer 98 and a magnetically soft layer 100. Edges of the write poles are positioned adjacent to an air bearing surface 102 of the write head.

Figure 13:
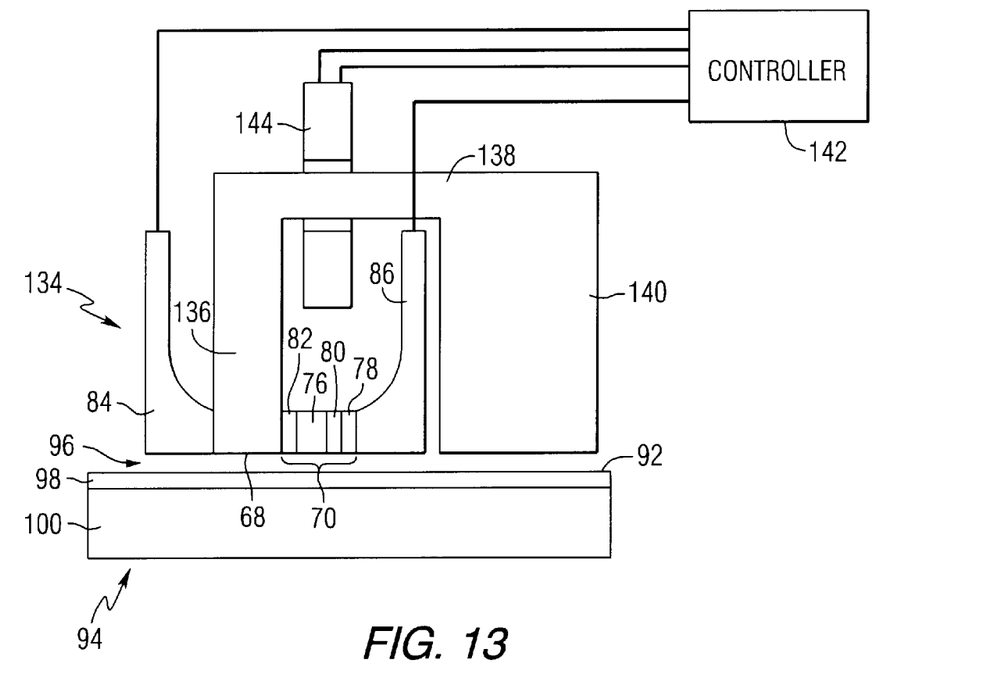
FIG. 13 is a block diagram of a write head and an associated controller.

The write head of FIG. 6 can apply two predominantly orthogonal magnetic fields that originate from two independently controllable ferromagnetic poles. The write head of FIG. 6 includes a combination of the conventional writer 68 and writer 70, with writer 70 being driven by the torque from a current-perpendicular-to-the-plane (CPP) spin-polarized electron current. The conventional write pole 72 comprises a metallic ferromagnetic material and has its magnetization driven by the field from a current carrying wire in much the same way as is done with previous writers. Note that while the write pole is shown as a single layer in FIG. 6, a complete yoke structure can also be employed as shown in FIG. 13, if necessary, to improve the efficiency. A complete yoke would include a return pole connected to the write pole 72. The return pole would have a cross-sectional area at the air bearing surface that is greater than the cross-sectional area of the write pole at the air bearing surface.

In order to make the two-pole writer structure compact, the write pole 72 can be integrated as part of the lead in a CPP spin transfer writer structure (that is, electrical current can flow through the write pole 72). The second write pole comprises a free layer 76 incorporated into a pillar, or stack, of alternating layers of magnetic and non-magnetic material. The magnetization of the free layer 76 is controlled by the spin transfer torque of conduction electrons ($I_{CPP}$) flowing between the free layer 76 and a layer with fixed magnetization (pinned layer 78).

As shown in FIG. 6, the write head includes a pinned layer 78, having a fixed magnetization aligned in a first direction. The direction of magnetization is perpendicular to the surface of the magnetic media, and oriented either toward or away from the magnetic media. The free layer 76 can be aligned either parallel or anti-parallel with respect to the pinned layer 78 by applying a CPP electric current of sufficient magnitude and proper direction through the stack. The pinned layer 78 can, in principle, be any pinned and/or hard layer combination. For instance, the pinned layer can be comprised of synthetic antiferromagnet (SAF) that is pinned via exchange coupling to an antiferromagnet or a hard magnetic material. The synthetic antiferromagnet includes two ferromagnetic layers separated by a non-magnetic transition metal spacer that induces very strong antiferromagnetic coupling, such as Ru. The magnetization of each ferromagnetic layer of the antiferromagnet is fixed along one specific direction by having one of the layers exchange coupled to either an antiferromagnet or a hard magnetic material. Other examples of pinned layers that could be used include: a single ferromagnetic layer exchange coupled to an antiferromagnet; a single layer of hard magnetic material, such as CoPt; or a single ferromagnetic layer exchange coupled to a hard magnet.

The non-magnetic layer can be constructed of, for example, copper, silver or gold. A means for biasing the magnetization of the pinned layer, which can be for example a permanent magnet or an antiferromagnet, can be positioned adjacent to the pinned layer. The write head is positioned such that a first edge of the free layer lies adjacent to a surface of the magnetic recording medium. The magnetization of the free layer produces magnetic flux at the first edge of the free layer that is used to record information bits in the magnetic recording medium.

FIG. 6 shows an air bearing between the write head and the magnetic recording medium. However, this invention also encompasses embodiments used for contact recording in which there is no air bearing. Thus in the above description, the words "adjacent to" encompass both "near" and "in contact with".

Figure 7:
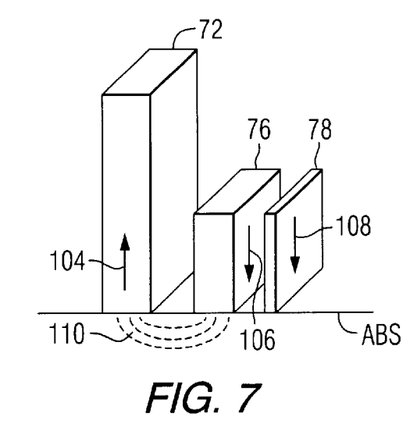
FIGS. 7 and 8 are schematic representations of selected elements of a magnetic write head constructed in accordance with the invention.
Figure 8:
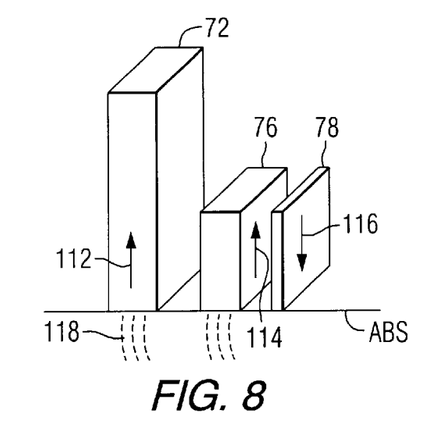

FIGS. 7 and 8 are schematic representations of selected elements of a magnetic write head constructed in accordance with the invention. In FIG. 7, the directions of magnetization in the write pole 72, free layer 76, and pinned layer 78 are illustrated by arrows 104, 106 and 108 respectively, and provide a schematic illustration of the pole configuration when applying an in-plane field, that is, a fringing field in the plane of the magnetic media. The write pole 72 write current and the CPP current are such that the two poles are aligned anti-parallel to each other and perpendicular to the media. The fringing field 110 between the two poles provides the in-plane field. In FIG. 8, the directions of magnetization in the write pole 72, free layer 76, and pinned layer 78 are illustrated by arrows 112, 114 and 116 respectively. FIG. 8 is an illustration of the direction of the magnetic fields in the poles when applying a perpendicular field 118. In this case, the write pole current ($I_{yoke}$) is the same as in FIG. 7 but the CPP current is reversed in order to produce parallel alignment of the write pole 72 and free layer 76 magnetization.

Figure 9:
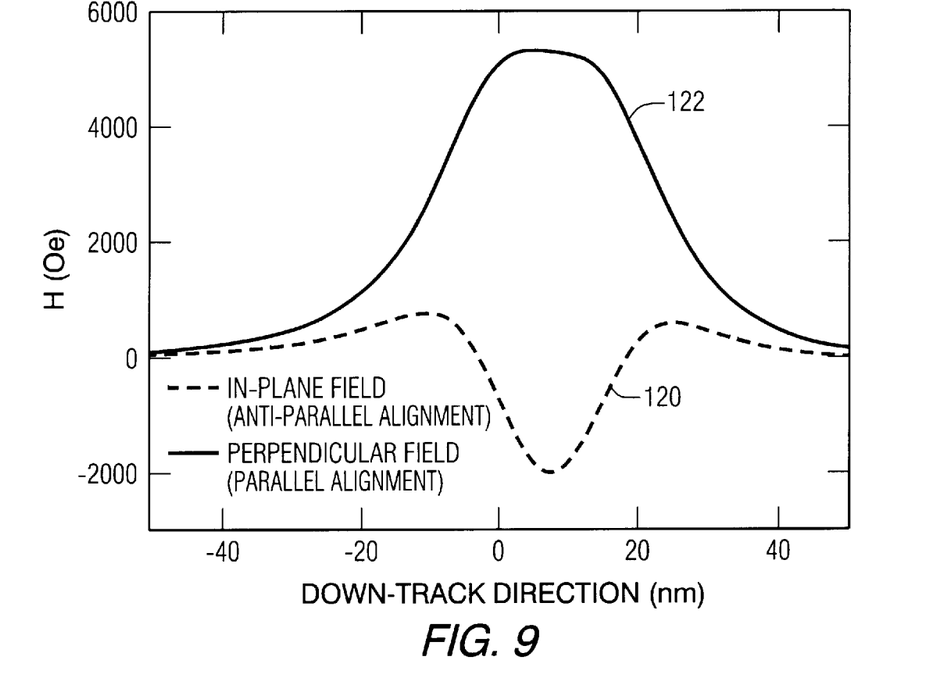
FIG. 9 is a graph that shows the magnetic fields that can be produced by magnetic write heads constructed in accordance with the invention.

FIG. 9 is a graph of the write field, H, calculations for a write head as shown in FIG. 6. The spacing between the air bearing surface of the head and soft underlayer of the storage media was assumed to be 16 nm. Both poles are assumed to be uniformly magnetized and have a magnetic saturation of $B_s$=2.2 T. Using superposition and assuming perfect images in the soft underlayer, the fields are calculated at the center of the track and 10 nm below the writer. The pinned layer 78 magnetization is oriented perpendicular to the disc/media. FIG. 9 shows the field calculations for the two pole configurations, with line 120 showing the in-plane field and line 122 showing the perpendicular field. For the sake of clarity, the in-plane field is shown for the case when the poles are aligned anti-parallel with respect to each other, and the perpendicular field is shown for the case when the poles are aligned parallel to each other.

Figure 10:
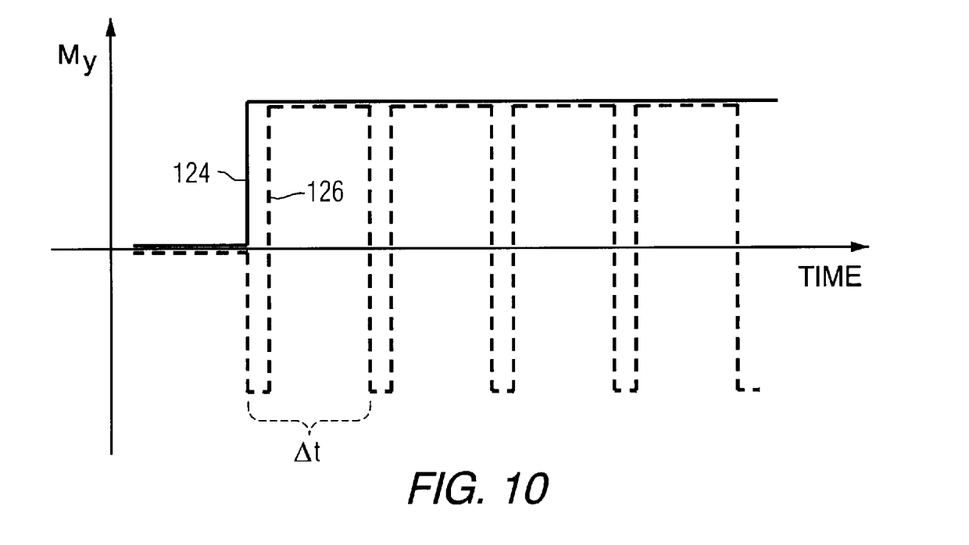
FIGS. 10 and 11 are switching diagrams that illustrate the operation of magnetic write heads constructed in accordance with the invention.
Figure 11:
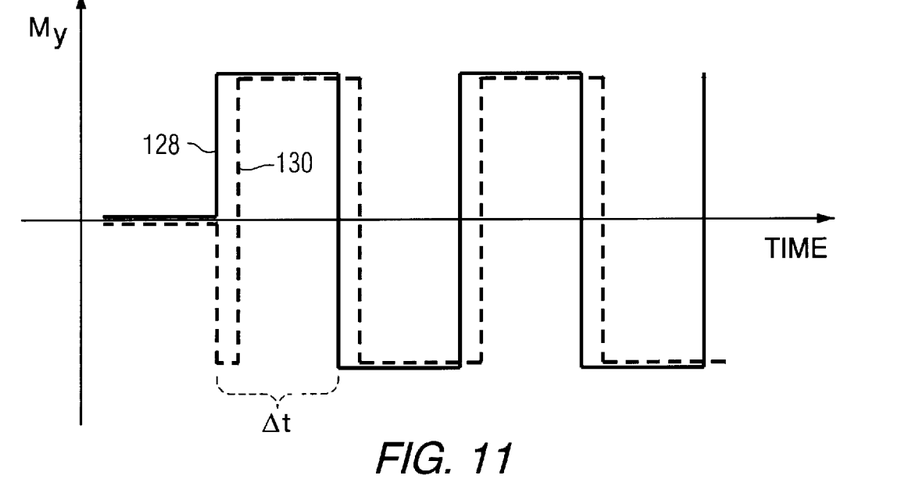

FIGS. 10 and 11 are schematic plots of the perpendicular magnetization versus time for each write pole. FIG. 10 shows the magnetization sequence for recording a series of 0's. The poles of the writers are initially magnetized anti-parallel in order to produce the in-plane field. The pole that sets the final media magnetization direction illustrated by line 124 is fixed while the other pole illustrated by line 126 is switched twice by 180° whenever the displacement of the head with respect to the media equals one bit length. FIG. 11 shows the magnetization sequence for recording a series of 1's. In this sequence, the pole producing the "setting" field illustrated by line 128, is switched by 180° when recording a new bit, or transition. A slight delay is introduced before switching the other pole illustrated by line 130, so that the in-plane field can be applied. The time period Δt in FIGS. 10 and 11 represents the bit length divided by the linear velocity of the medium.

Figure 12:
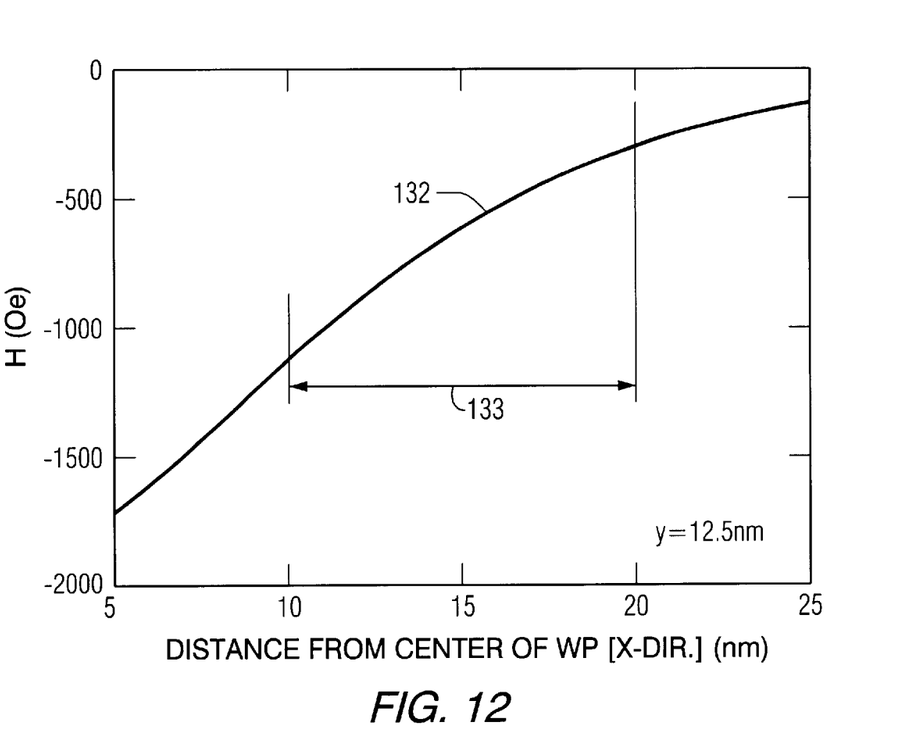
FIG. 12 is a graph of a calculated magnetic field that can be produced by write heads of this invention.

FIG. 12 shows the stray field 132 from the write pole 72 when uniformly magnetized along the positive y-direction, as defined in FIG. 6. The field is plotted as a function of position away from the center of the write pole 72 along the x-direction, with the edge of the write pole 72 located at x=10 nm. The field is evaluated at a position 12.5 nm back from the ABS (y=12.5 nm). Note that the field from the current carrying wire is omitted from this calculation. The arrow 133 indicates the position and thickness of the free layer 76.

FIG. 13 is a block diagram of a write head and controller in accordance with the invention. The write head 134 is similar to that of FIG. 6 except that the write pole 136 is a portion of a yoke 138 that also includes a return pole 140. The controller 142 supplies current pulses to the contacts to produce $I_{CPP}$ and to the coil 144 with the timing of the pulses being controlled as shown in FIGS. 10 and 11.

Figure 14:
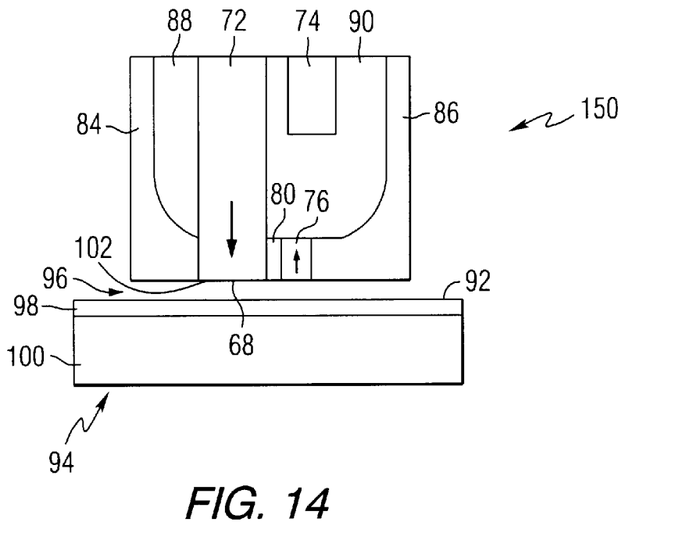
FIG. 14 is a side elevation view of another magnetic write head constructed in accordance with the invention.

One modification of the write head is to remove the pinned layer 78, and make spacer 80 such that it preserves the electron spin polarization between the write pole and free layer 76, and then use the write pole as a reference layer when controlling the free layer 76 magnetization with spin transfer torque. FIG. 14 is a side elevation view of an alternative magnetic write head constructed in accordance with this modification. The write head 150 of FIG. 14 is similar to that of FIG. 6 without the pinned layer 78 and spacer 82. This modification will require the write pole to have a well-defined, uniform magnetization state in the pole tip (i.e. magnetize the write pole) in order to have a predictable free layer 76 response.

The invention provides a writer with the potential to provide ~1 Tbit/in² magnetic recording. In order to estimate the write field performance, we will refer to some of the parameters in a suggested 1 Tbit/in² recording system, see Wood, R., "The Feasibility of Magnetic Recording at 1 Terabit per Square Inch", IEEE Transactions on Magnetics, Vol. 36, No. 1, January 2000. Table I below summarizes the relevant parameters for an example design. We will omit those parameters related to the optimization of the current efficiency of the write poles and instead focus only on those parameters that impact the write field. Furthermore, we will ignore stray fields from electrical currents and presume the moment and thickness of the pinned layer 78 are such that the stray field from this layer is small.

TABLE I

| | write pole (WP) | free layer (FL) |
|---|---|---|
| $B_s$ | 2.2 T | 2.2 T |
| width [cross-track dir.] | 50 nm | 50 nm |

TABLE I-continued

| | write pole (WP) | free layer (FL) |
|---|---|---|
| thickness [down-track dir.] | 10 nm | 10 nm |
| stripe height | N/A | 25 nm |
| spacer 1 thickness | 5 nm | |
| pole configuration: in-plane field | anti-parallel | |
| pole configuration: perp. field | parallel | |

Illustrations of the pole configurations are shown in FIGS. 7 and 8. In the quiescent state of the device, both write currents, $I_{yoke}$ and $I_{CPP}$, are nominally zero and the perpendicular component of the magnetization $M_y$ (in the Y direction as defined in FIG. 6) is much less than the saturation magnetization $M_s$ of the corresponding pole. The write pole is designed so that it has a remnant state with $M_y$=0. The free layer 76 is biased so that its magnetization is parallel to the disc, which can be accomplished through a variety of methods. The initial in-plane field is produced by applying the appropriate $I_{yoke}$ and $I_{CPP}$ so that the poles are aligned anti-parallel to one another. The write pole 72 will align along the field from the current carrying wire while the free layer 76 will align either parallel or anti-parallel to the pinned layer 78 according to the direction of $I_{CPP}$. The media magnetization will be driven toward the plane of the disc by this first field. For the example shown in FIGS. 7 and 8, the free layer 76 is then quickly switched 180° by reversing $I_{CPP}$ to induce parallel alignment of the poles. The time scale of the free layer 76 reversal is fast relative to the media magnetization dynamics so that the media does not relax back to its initial state. Note that perpendicular (or in-plane) fields are omitted from FIG. 9 for anti-parallel (or parallel) pole alignment. These fields can easily be >1000 Oe. However, the maximum amplitude occurs at a location away from where the bits are recorded. In general, it will be best to design the head such that any distortion of the media magnetization by these stray fields can be overwritten, similar to what is presently done with conventional writers.

FIGS. 7 and 8 illustrate the directions of magnetization in the conventional write pole 72, the free layer 76 and the pinned layer 78. The pinned layer magnetization is fixed and oriented either toward or away from the air-bearing surface. In the quiescent state of the device, the free layer magnetization would be parallel to the air bearing surface (ABS). There is nominally no field component, aside from stray fields, directed toward the media by the free layer. There are several options, such as shape anisotropy, field-induced uniaxial anisotropy, and magnetostatic fields from permanent magnets, to bias the free layer in a direction offset 90° with respect to the pinned layer. Note that, in general, a quiescent state bias current, $I_q$, that is different than zero may need to be applied in order to keep the free layer parallel to the ABS. FIG. 7 shows biasing of the device below a first threshold current ($I_c^-$). The free layer magnetization is oriented toward the media. FIG. 8 shows biasing of the device above a second threshold current ($I_c^+$). The free layer magnetization is oriented away from the media.

The write process for recording a single bit includes a sequence of anti-parallel and parallel pole alignment. FIGS. 10 and 11 illustrate the proper switching of the pole magnetizations when recording a series of bits. Unlike conventional writers, which simply produce a constant field when recording a series of zeroes (i.e. no transitions), the two-pole writer must produce an in-plane field every time the head moves one bit length with respect to the media. Similar to conventional writers, one pole is magnetized in the direction of the intended final media magnetization direction, referred to as the "setting" pole and shown as lines 124 and 128 in FIGS. 10 and 11. However, the other pole, referred to as the "switching" pole and shown as lines 126 and 130 in FIGS. 10 and 11, must be briefly switched into anti-parallel alignment for every bit. When recording a series of one's (i.e. a series of transitions), the pole magnetizations are alternately switched. After the first bit is recorded, the setting pole is switched by 180° while the switching pole is fixed for a brief period, producing anti-parallel alignment. The switching pole is then switched into parallel alignment to complete the recording of the bit.

Various aspects of the performance of the write head described above can be optimized. For example, the dimensions of the poles in the down-track direction can be optimized for both field amplitude and localization. For a given track width, the perpendicular field component under a pole will increase as the pole dimension along the down-track direction increases. However, the down-track dimension of the trailing pole cannot be significantly larger than the bit length. Otherwise, the write head will potentially corrupt the magnetization of bits already recorded in a dense series of flux changes (i.e. a series of 1's). The amplitude of the write field can increase if the physical width of the writer is made larger than that proposed in the example design. Calculations show that the field amplitude in the media decreases to one half its maximum value 25 nm away from the center of the track (i.e. directly under the edge of the writer).

The above example applies the in-plane field along the down-track direction in order to produce a uniform write field across the track. However, the write head can be modified such that the in-plane fields are applied in the cross-track direction.

In addition, the fast rise-time current pulses that switch the poles can be more complex than a single pulse. For instance, one can apply a sequence of pulses with the correct timing to suppress spin precession of the free layer 76 and set the free layer 76 into its equilibrium configuration in a significantly shorter time than the period of spin precession.

Furthermore, the ordering of the poles with respect to the leading and trailing edges of the writer can, in principle, be interchanged. The only constraint is that the design should be optimized such that stray fields don't corrupt the bits that have been recorded (either down-track or cross-track).

The field from the current carrying wire, $I_{yoke}$, can be used to tune the net magnetic field through the free layer 76. For instance, it would be straightforward to arrange a geometry in which the field from $I_{yoke}$ opposes the fringe field from the write pole 72 in the region where the free layer 76 is located. This could lower the net field in the free layer 76 and decrease the spin transfer torque necessary to switch the free layer 76.

In principle, this concept can be extended to a writer having more than two write poles. However, due to the constraints on making the writer compact, there will most likely be significant interaction between conventional write poles if they are driven by separate current carrying wires. Furthermore, additional spin transfer poles will most likely be driven by the same current in order to preserve the compact size of the writer. Hence, their relative orientation with respect to one another would be fixed for a given CPP write current.

This invention also encompasses a method of writing to magnetic storage media in which an in-plane magnetic field is first applied substantially orthogonal to the perpendicular magnetization of the media, which rotates the magnetization away from its initial state. This first magnetic field is removed and a second perpendicular field is applied over a period of time that is fast with respect to the media relaxation time. The fall time of the in-plane field and the rise time of the perpendicular field are such that the magnetization cannot precess, or relax, back to its original state. The second perpendicular field can then reverse the media magnetization even though it is less than the media coercivity. In general, the timing, or delay, between the in-plane and perpendicular fields will also affect the magnetization reversal process.

The invention provides a write head for high areal density magnetic recording that is designed to switch high anisotropy media using fields less than $H_k$. The writer includes two independently controllable ferromagnetic poles that can apply either in-plane or perpendicular fields of several 1000's of Oe from the same physical location underneath the head. One pole is driven by the field from a current-carrying wire and the other is driven by the spin transfer torque of a CPP electrical current. By applying the proper sequence of fast write pulses, the writer can quickly switch between a predominantly in-plane field and a perpendicular field. As a result, the media will switch orientation even though the perpendicular field is smaller than the usual 180° reversal field in the absence of in-plane fields. This will allow for further increases in media anisotropy while staying within the constraints imposed by $B_s$=2.4 T materials, potentially extending magnetic recording to 1 Tbit/in$^2$.

The write head has to be capable of applying two predominantly orthogonal field components from the same spatial location on the head. This follows from the media magnetization dynamics and the linear velocity of the media with respect to the head. The precessional frequency of high anisotropy media is likely to be on the order of 10 to 20 GHz, and the switching between the orthogonal fields will have to occur in at most 100 ps. In contrast, the linear velocity of the storage media will be ~40 m/s (for 15 k rpm and a 1 inch radius). Another way of expressing this is that the head will move 4 nm with respect to the media every 100 ps. A head design that does not have the in-plane and perpendicular fields spatially overlapped would be less effective than one where the fields are applied to the same spatial region.

While it is possible to switch magnetic grains using fields less than $H_k$, it will still be necessary to produce very large magnetic fields (1000's of Oe) in order to switch high anisotropy media. Furthermore, these fields must be localized so as to minimize the impact on data in adjacent tracks.

Writers traditionally use the fringe fields from ferromagnetic material to produce the write field. However, using ferromagnetic material to produce two orthogonal field components at the same spatial location will require two independently controllable pole tips.

The orientation of the two fields is important. There are two possible geometries with which to apply these orthogonal fields. The second field is aligned with the final media magnetization (perpendicular for perpendicular recording). However, the first field may be applied either cross-track or down-track. Applying the field in the down-track direction has the advantage that the down-track field confinement is not as critical as the cross-track confinement, because it will be overwritten.

Good thermal conductors should be used for the electrical leads in order to maximize the thermal conductivity between the head and large thermal reservoirs that are well heat-sunk. Any reduction of the free layer magnetic moment due to heating must be minimized. It is also preferable to minimize the stray field from the pinned layer.

This invention uses the torque induced from a CPP spin-polarized electron current to rotate the writer magnetization. The invention is particularly applicable for use in perpendicular recording wherein the magnetic storage media includes a disc having a top layer of hard magnetic material, and a bottom layer of soft magnetic material adjacent to the top layer of hard magnetic material.

This invention also encompasses disc drives that include the write head. As shown in FIG. 1, an arm 18 can serve as a means for positioning the write head adjacent to a magnetic recording medium.

While the present invention has been described in terms of what are at present believed to be its preferred embodiments, it will be apparent to those skilled in the art that various modifications can be made to the disclosed embodiments without departing from the scope of the invention as set forth in the following claims.

What is claimed is:

1. A write head for writing information bits to magnetic storage media, the write head comprising:
    a first write pole for producing a first magnetic field in a first direction; and
    a second write pole for producing a second magnetic field such that a combined field from the first and second write poles lies either substantially along the first direction or in a second direction that is substantially orthogonal to the first direction, wherein the second write pole includes a free layer having magnetization controlled by spin transfer torque, and a first spacer positioned between the free layer and the first write pole.

2. A write head according to claim 1, further comprising:
    a pinned layer; and
    a second spacer positioned between the pinned layer and the free layer.

3. A write head according to claim 2, further comprising:
    means for controlling the direction of magnetization in the first write pole; and
    means for passing a current through the pinned layer, the second spacer, and the free layer to control the direction of magnetization of the free layer.

4. A write head according to claim 2, wherein the pinned layer comprises one of:
    a synthetic antiferromagnet having one layer exchange coupled to either an antiferromagnet or hard magnet, a ferromagnetic exchange layer coupled to an antiferromagnet, a layer of hard magnetic material, or a ferromagnetic layer exchange coupled to a hard magnet.

5. A write head according to claim 2, wherein the second spacer comprises one of:
    copper, silver or gold.

6. A write head according to claim 1, wherein the first pole comprises:
    a yoke including the first write pole and a return pole; and
    a first coil for inducing a magnetic field in the yoke.

7. A disc drive comprising:
    means for rotating a magnetic storage medium; and
    means for positioning a write head adjacent to a surface of the magnetic storage medium;

wherein the write head includes a first write pole for producing a first magnetic field in a first direction, and a second write pole for producing a second magnetic field such that a combined field from the first and second write poles lies either substantially along the first direction or in a second direction that is substantially orthogonal to the first direction; and wherein the second write pole includes a free layer having magnetization controlled by spin transfer torque, and a first spacer positioned between the free layer and the first write pole.

8. A disc drive according to claim 7, wherein the write head further comprises:

a pinned layer; and a second spacer positioned between the pinned layer and the free layer.

9. A disc drive according to claim 8, further comprising:

means for controlling the direction of magnetization in the first write pole; and means for passing a current through the pinned layer, the second spacer, and the free layer to control the direction of magnetization of the free layer.

10. A disc drive according to claim 8, wherein the pinned layer comprises one of:

a synthetic antiferromagnet having one layer exchange coupled to either an antiferromagnet or hard magnet, a ferromagnetic exchange layer coupled to an antiferromagnet, a layer of hard magnetic material, or a ferromagnetic layer coupled exchange coupled to a hard magnet.

11. A disc drive according to claim 8, wherein the second spacer comprises one of:

copper, silver or gold.

12. A disc drive according to claim 7, wherein the first pole comprises:

a yoke including the first write pole and a return pole; and a first coil for inducing a magnetic field in the yoke.

13. A method of writing to magnetic storage media, the method comprising:

using a first write pole and a second write pole to produce a first magnetic field in a first direction to create a first change in the direction of magnetization of magnetic domains in the magnetic storage media;

removing the first magnetic field; and using the first write pole and the second write pole to produce a second magnetic field lying substantially orthogonal to the first direction to switch the direction of magnetization of the magnetic domains in the magnetic storage media, wherein one of the first and second write poles includes a free layer having magnetization controlled by spin transfer torque.

14. The method of claim 13, wherein the first magnetic field is oriented in one of a down track direction or a cross track direction.

15. The method of claim 13, wherein each of the first and second magnetic fields has a magnitude less than the magnetic anisotropy of the magnetic storage media.

16. The method of claim 13, wherein the magnetic storage media comprises:

a disc having a top layer of hard magnetic material and a bottom layer of soft magnetic material adjacent to the top layer of hard magnetic material.

17. The method of claim 13, wherein the step of using a first write pole and a second write pole to produce a first magnetic field in a first direction comprises applying a first current pulse to the first write pole and a second current pulse to the second write pole, and wherein the step of using the first write pole and the second write pole to produce a second magnetic field comprises applying a third current pulse to a second write pole.

18. The method of claim 17, wherein transitions between the second and third current pulses are separated in time by a period less than a relaxation time of the magnetic storage media.

19. The method of claim 13, wherein the step of using a first write pole to produce a first magnetic field in a first direction comprises applying a sequence of current pulses to the first write pole, wherein the current pulses are timed to suppress spin precession of the free layer in the first write pole.

20. The method of claim 19, wherein the step of producing a second magnetic field comprises applying additional current pulses to the second write pole.

* * * * *

UNITED STATES PATENT AND TRADEMARK OFFICE
CERTIFICATE OF CORRECTION

PATENT NO. : 6,785,092 B2  
DATED : August 31, 2004  
INVENTOR(S) : Mark William Covington et al.

It is certified that error appears in the above-identified patent and that said Letters Patent is hereby corrected as shown below:

<u>Title page, Item [54] and Column 1, line 1,</u>  
Title, "WHITE" should read -- WRITE --.

Signed and Sealed this

Fourth Day of April, 2006

JON W. DUDAS  
*Director of the United States Patent and Trademark Office*